(12) United States Patent
Foley et al.

(10) Patent No.: US 8,205,995 B2
(45) Date of Patent: Jun. 26, 2012

(54) OPTICAL DEVICE AND SYSTEM FOR PRIVACY OR CONTRAST ENHANCEMENT AND METHODS OF USE THEREOF

(75) Inventors: Michael F. Foley, Avon, CT (US); James F. Munro, Walworth, NY (US)

(73) Assignee: Reflexite Corporation, Avon, CT (US)

( * ) Notice: Subject to any disclaimer, the term of this patent is extended or adjusted under 35 U.S.C. 154(b) by 672 days.

(21) Appl. No.: 12/221,807

(22) Filed: Aug. 7, 2008

(65) Prior Publication Data

US 2010/0033827 A1   Feb. 11, 2010

(51) Int. Cl.
*G02B 27/00* (2006.01)
(52) U.S. Cl. ......... 359/614; 359/615; 359/885; 359/900
(58) Field of Classification Search ............ 359/609, 359/613, 614, 615, 885, 887, 890, 891, 892, 359/893, 900
See application file for complete search history.

(56) References Cited

U.S. PATENT DOCUMENTS

| | | | |
|---|---|---|---|
| 1,578,982 A | 3/1926 | Gloster | |
| 2,053,173 A | 9/1936 | Astima | |
| 2,980,567 A | 4/1961 | Steel | |
| 3,241,429 A | 3/1966 | Rice et al. | |
| 3,437,405 A | 4/1969 | Northrop | |
| 3,919,559 A | 11/1975 | Stevens | |
| 4,056,418 A | 11/1977 | Aspin | |
| 4,096,216 A | 6/1978 | Yevick | |
| 4,575,767 A | 3/1986 | Cohen et al. | |
| 4,621,898 A | 11/1986 | Cohen | |
| 4,663,562 A | 5/1987 | Miller et al. | |
| 4,764,410 A | 8/1988 | Grzywinski | |
| 4,766,023 A | 8/1988 | Lu | |
| 4,812,709 A | 3/1989 | Dudasik | |
| 5,147,716 A | 9/1992 | Bellus | |
| 5,204,160 A | 4/1993 | Rouser | |
| 5,254,388 A | 10/1993 | Melby et al. | |
| 5,897,980 A | 4/1999 | Phillips et al. | |
| 6,021,007 A * | 2/2000 | Murtha | 359/834 |
| 6,239,853 B1 | 5/2001 | Winker et al. | |
| 6,381,072 B1 | 4/2002 | Burger | |
| 6,398,370 B1 * | 6/2002 | Chiu et al. | 359/613 |
| 6,597,417 B1 | 7/2003 | Veligdan | |
| 6,627,125 B1 | 9/2003 | Nishikawa | |
| 6,765,550 B2 | 7/2004 | Janick et al. | |

(Continued)

FOREIGN PATENT DOCUMENTS

EP   1857842   11/2007

OTHER PUBLICATIONS

International Search Report for International Patent Application No. PCT/US08/72475 (Nov. 4, 2008).

(Continued)

*Primary Examiner* — Frank Font
(74) *Attorney, Agent, or Firm* — LeClair Ryan, a Professional Corporation

(57) ABSTRACT

The present invention relates to an optical device for privacy or contrast enhancement of a viewing display. Also disclosed are a system including the optical device and methods of improving privacy or contrast of a viewing display, such as a plasma display panel, a liquid crystal display panel, an inorganic light emitting diode display panel, or an organic light emitting diode display panel.

55 Claims, 11 Drawing Sheets

U.S. PATENT DOCUMENTS

| | | | |
|---|---|---|---|
| 6,773,122 B2 * | 8/2004 | Miyazaki et al. | 359/613 |
| 7,083,292 B2 * | 8/2006 | Takemoto | 359/613 |
| 7,156,529 B2 * | 1/2007 | Van Gorkom | 359/614 |
| 7,428,367 B2 | 9/2008 | Lubart et al. | |
| 7,595,934 B2 | 9/2009 | Lubart et al. | |
| 7,712,932 B2 * | 5/2010 | Parker et al. | 362/337 |
| 2003/0107802 A1 * | 6/2003 | Dubin et al. | 359/449 |
| 2004/0217620 A1 | 11/2004 | Matsco et al. | |
| 2004/0234188 A1 | 11/2004 | Kerr et al. | |
| 2006/0145578 A1 | 7/2006 | Park et al. | |
| 2007/0132378 A1 | 6/2007 | Cok et al. | |
| 2007/0138663 A1 | 6/2007 | Biegelsen | |
| 2007/0187852 A1 | 8/2007 | Parker et al. | |
| 2008/0032425 A1 | 2/2008 | Hillis et al. | |
| 2008/0074769 A1 * | 3/2008 | Kobayashi et al. | 359/891 |
| 2010/0051176 A1 | 3/2010 | Foley et al. | |
| 2010/0105830 A1 | 4/2010 | Kaneko | |
| 2010/0202051 A1 | 8/2010 | Yoshimi et al. | |
| 2010/0208165 A1 | 8/2010 | Kamada | |
| 2010/0208355 A1 | 8/2010 | Kashiwagi et al. | |
| 2010/0328778 A1 * | 12/2010 | Mimura et al. | 359/614 |

OTHER PUBLICATIONS

Quarterly PDP Components Report: PDP Optical Filters, Display Search (Jan. 4, 2008).
Office Action for U.S. Appl. No. 12/229,990 (Apr. 13, 2010).
Office Action for U.S. Appl. No. 12/229,990 (Oct. 27, 2010).
International Search Report and Written Opinion for International Patent Application No. PCT/US08/74582 (Jul. 6, 2009).
Written Opinion for International Patent Application No. PCT/US08/72475 (Nov. 4, 2008).

* cited by examiner

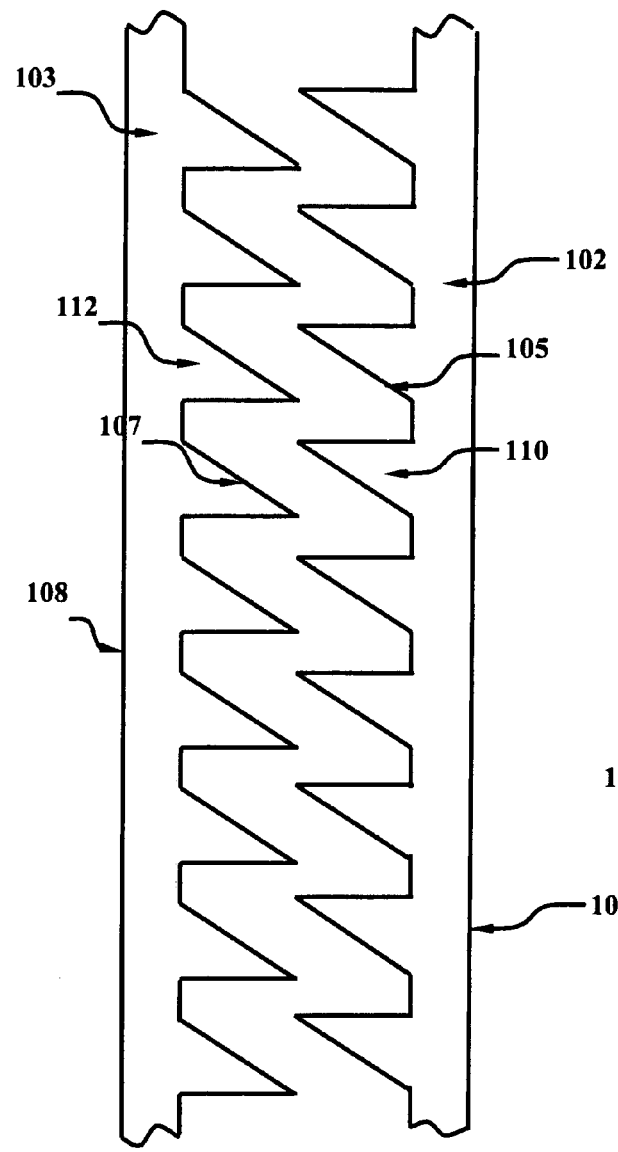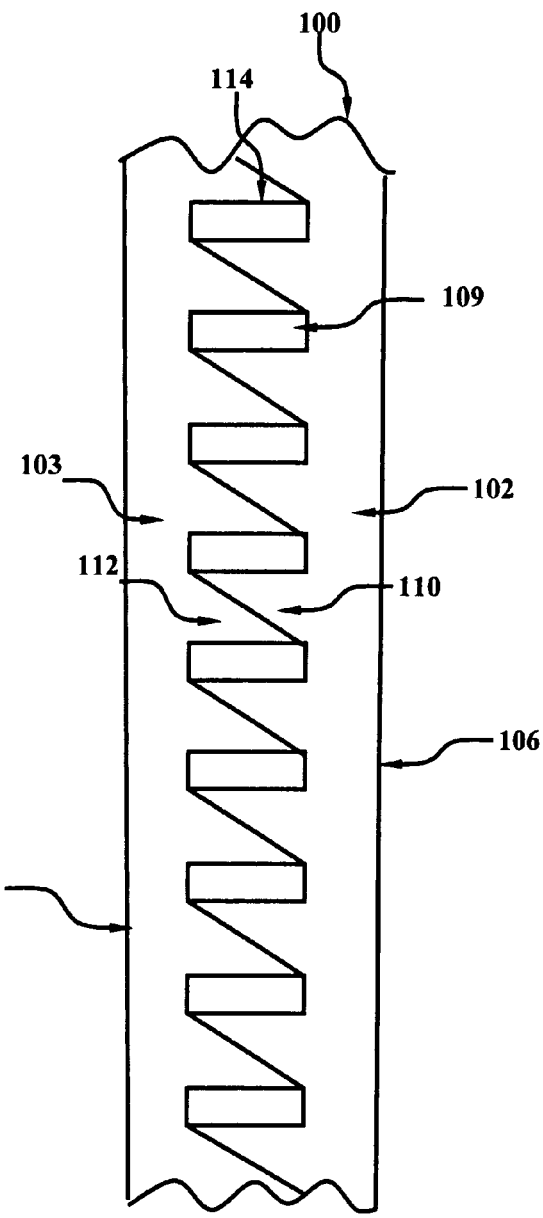
FIG. 2A                    FIG. 2B

OPTICAL DEVICE AND SYSTEM FOR PRIVACY OR CONTRAST ENHANCEMENT AND METHODS OF USE THEREOF

FIELD OF THE INVENTION

The present invention relates to an optical device which can be used as a privacy screen or for contrast enhancement, particularly daytime/high ambient light contrast enhancement, of a viewing display, such as a plasma display panel, a liquid crystal display ("LCD") panel, an inorganic light emitting diode ("iLED") display panel, or organic light emitting diode ("OLED") display panel and methods thereof.

BACKGROUND

Flat panel screens, in particular plasma display panels (PDPs), enable color pictures with high definition, large screen diagonals, and have a compact structure. A plasma screen comprises a sealed gas-filled glass cell with grid-like arranged electrodes. By applying an electric voltage, a gas discharge is caused which mainly generates light in the vacuum ultraviolet range ("VUV"). Fluorescence transforms this VUV light into visible light and the front plate of the glass cell emits this visible light to the viewer.

When compared to LCD-type large area displays or televisions, PDPs suffer from poor contrast in bright viewing conditions, because ambient light is reflected by the emission cells of the PDP and washes out the blacks in an image. Since LCD and plasma TV's are now comparable in selling price, contrast performance is becoming a deciding factor in the purchase of a flat panel TV. Plasma TV manufacturers are searching for a simple and low-cost method of improving the contrast, in particular, daytime or high ambient light contrast, of their displays, that does not degrade other PDP performance characteristics, such as resolution and on-axis luminance or brightness.

Several solutions to this problem have been proposed involving various louvre structures. In general, there is a tradeoff between increasing contrast and decreasing transmission (i.e., increasing contrast with a filter decreases the brightness). In practice, the best systems can achieve 70% transmission.

One prior-art device for improving the black-level of a PDP is presented in FIG. 1. In this setup, PDP pixels 10A and 10B are situated behind a glass layer 12 of the display panel onto which is installed a film 15 for ambient light absorption. The ambient light absorption film 15 has a substrate 18 onto which is installed a series of black light-absorbing strips 14 between which are transparent apertures 16. The front face 20 of the ambient light absorption film 15 is transparent, but may be textured to reduce ambient light glare.

In operation, ambient light ray 30 that originates from a light source in the vicinity of the PDP, typically from an overhead room light, is incident on the front face 20 and refracts into the substrate 18 before striking a black stripe 14 at location 40 where it is absorbed. In this way ambient light is absorbed and prevented from reaching the highly reflective pixels 10A and 10B. However, light rays such as ray 32 refract through the front surface 20 into the substrate 18, but then miss the black stripes 14 and pass through an aperture 16 at position 42 unattenuated. This ray then passes through the glass layer 12 and is then incident on a PDP pixel 10A, at location 44 whereupon it is backscattered into a full hemisphere. Some of the backscattered light, such as ray 36, will be incident on a black stripe and be absorbed, such as at location 48. However other rays, such as ray 34, will pass through an aperture at position 46 between the black stripes and will exit the PDP system. These rays can be easily seen by the TV viewer, and degrade the viewing performance of the PDP by making the black colors appear gray, and by making the saturated colors appear dingy and pale.

The ambient light absorption film 15 also impacts the brightness of the PDP because a large portion of the light rays emitted by the pixels are absorbed by the black stripes. For example, light ray 62 emitted from pixel 10B at location 52 passes through the glass 12 and immediately strikes the backside of a black stripe at location 54 and is absorbed. On the other hand, light ray 64 emitted from pixel 10B at location 50 is able to pass through an aperture of the ambient light absorption film 15 at location 56 unattenuated.

To obtain maximum brightness then, the ratio of the width of the apertures 16 to the pitch of the black stripes needs to be maximized. But this is at odds with how black-level performance is maximized, and typically a trade-off between transmittance and ambient light absorption must be made at the light absorption film 15. Because of this compromise generally both the light transmission of the film and the ambient light absorption characteristics are deemed to be inferior to the performance of the LCD-type displays.

Consequently there is a genuine need for an ambient light absorption film that has high display light transmission and also high ambient light absorption that is easily constructed. The present invention is directed to overcoming these and other deficiencies in the art.

SUMMARY OF THE INVENTION

An optical device in accordance with embodiments of the present invention includes first and second opposing surfaces, wherein the optical device comprises a first portion having a first plurality of transparent protrusions extending from the first surface and a second portion having a second plurality of transparent protrusions extending from the second surface, wherein the first plurality of transparent protrusions self-aligns with the second plurality of transparent protrusions to form a plurality of spaced openings, said openings being at least partially filled with an opaque material and positioned to create alternating opaque and transparent sections.

A system for improving contrast of a viewing display in accordance with embodiments of the present invention includes the optical device and a viewing display, wherein the second surface of the second portion is proximate at least a portion of the viewing display.

A method for improving privacy or contrast of a viewing display in accordance with embodiments of the present invention includes providing an optical device including first and second opposing surfaces, wherein the optical device comprises a first portion having a first plurality of transparent protrusions extending from the first surface and a second portion having a second plurality of transparent protrusions extending from the second surface, wherein the first plurality of transparent protrusions self-aligns with the second plurality of transparent protrusions to form a plurality of spaced openings, said openings being at least partially filled with an opaque material and positioned to create alternating opaque and transparent sections. At least a portion of the second surface of the second portion is positioned proximate at least a portion of an output surface of a viewing display, wherein a portion of ambient light is absorbed by the optical device before reaching the viewing display and a portion of ambient light reflected from the viewing display is absorbed by the optical device.

Accordingly, the present invention provides devices, systems, and methods for improving the privacy and/or contrast of viewing displays, such as plasma display panels, LCD display panels, iLED display panels, and OLED display panels. The devices, systems, and methods of the present invention do not degrade other performance characteristics, such as resolution. In particular, transmitted light from the viewing display passes through the optical device with very little attenuation, i.e., over 90% transmission, whereas ambient light which strikes the viewing display from oblique angles, such as the sun or overhead lighting, will generally strike the opaque areas and be absorbed. In this way ambient light absorption is maximized without unduly impacting display light transmittance through the optical device. Additionally, the present invention provides an optical device that is easy and inexpensive to manufacture and which has a compact design. In particular, the optical device includes self-aligning portions which easily fit together in a saw-tooth or zipper fashion to form the resulting optical device having opaque regions with the desired size, shape and aspect ratio. This is in contrast to prior art designs which have to be carefully aligned in order to correctly position the light absorbing regions as desired, thereby increasing the time and cost of manufacture.

BRIEF DESCRIPTION OF THE DRAWINGS

FIGS. 2A-C are partial, cross-sectional views of an optical device in accordance with exemplary embodiments of the present invention;

DETAILED DESCRIPTION

Figure 1:
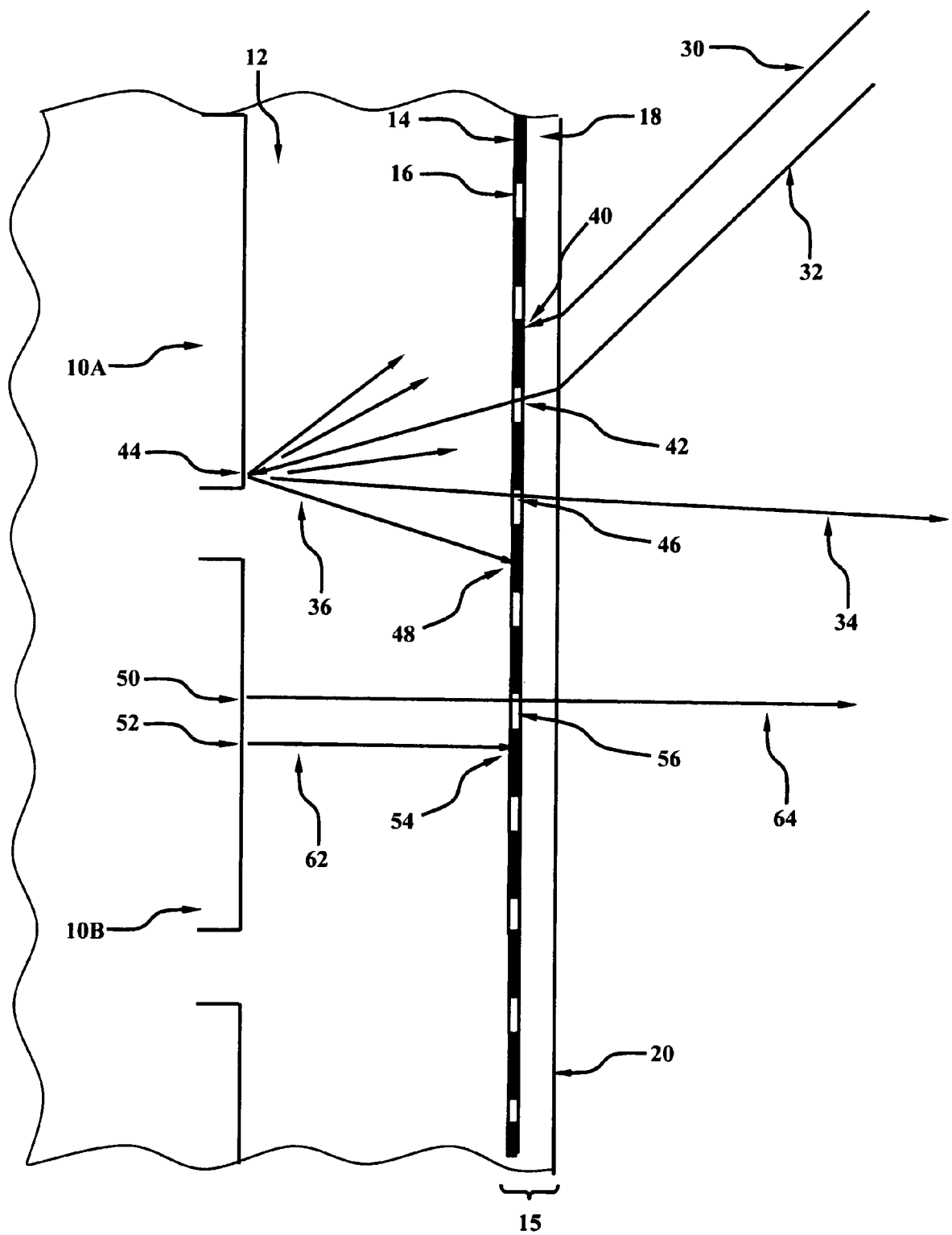
FIG. 1 is a partial, cross-sectional view of a prior art device for improving the black level of a plasma display panel.
Figure 2C:
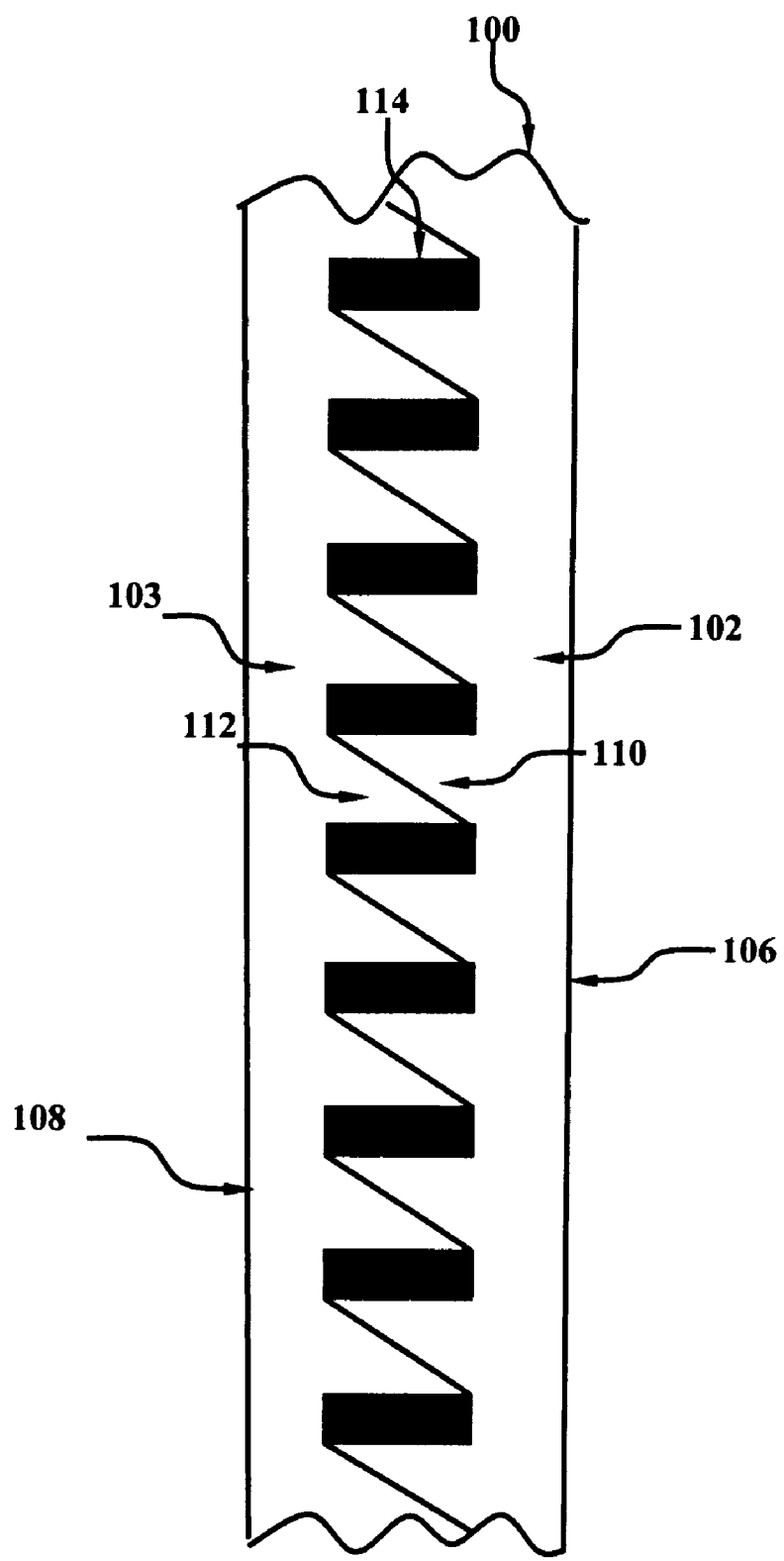
Figure 3:
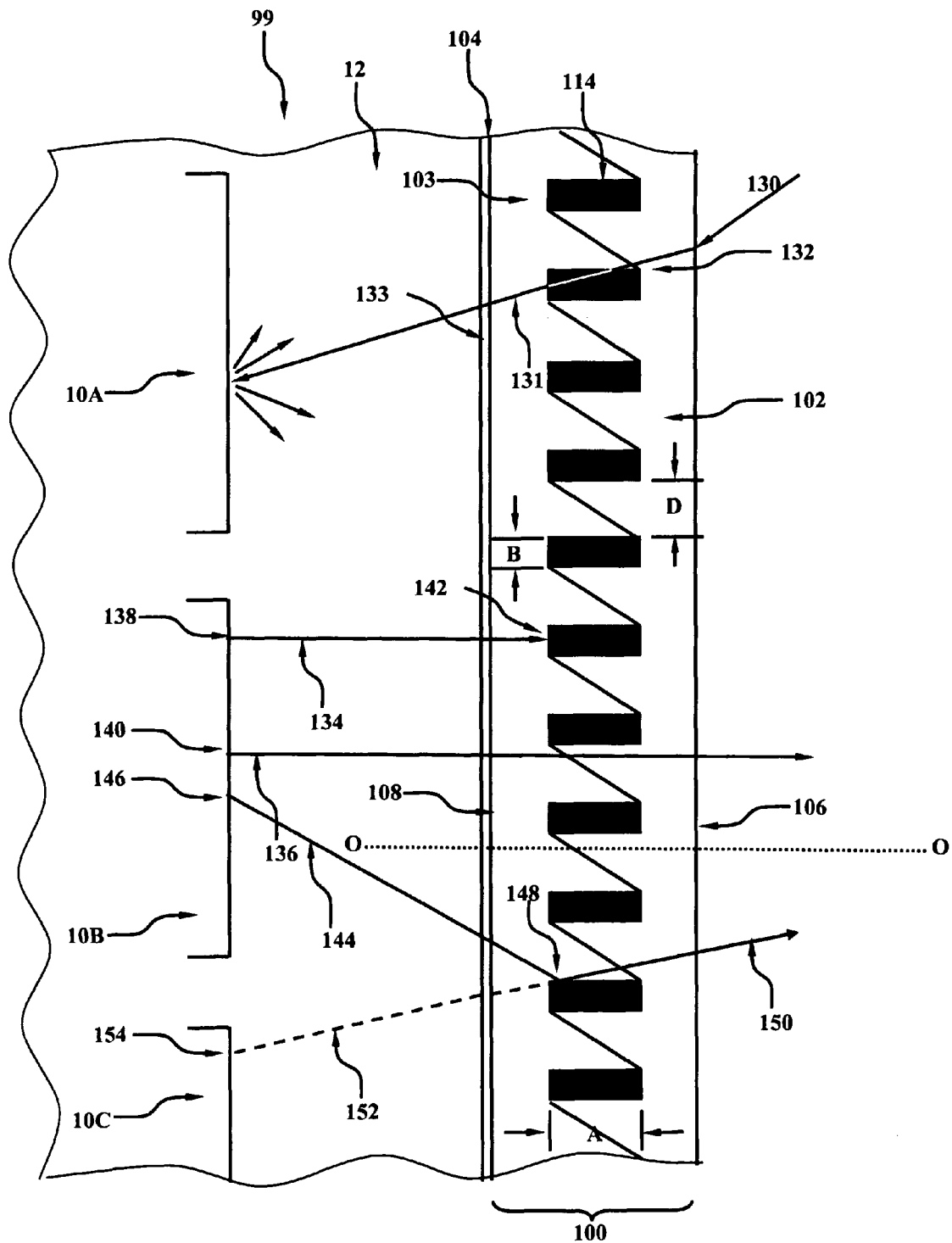
FIG. 3 is a partial cross-sectional view of the optical device illustrated in FIGS. 2A-C in a system in accordance with exemplary embodiments of the present invention.

A system 99 including an optical device 100 in accordance with embodiments of the present invention is illustrated in FIGS. 2A-3. Referring to FIGS. 2A-C, an optical device 100 is shown having a first surface 106 and an opposing second surface 108. In one embodiment, the optical device 100 has a thickness of from about 0.5 mm to about 5.0 mm. Normally first surface 106 is a planar, optically smooth surface.

As shown in FIGS. 2A-C, the optical device 100 includes a first transparent portion 102 having a first plurality of transparent protrusions 110 extending from the first surface 106 and a second transparent portion 103 having a second plurality of transparent protrusions 112 extending from the second surface 108. As shown in FIGS. 2A-C, the first plurality of transparent protrusions 110 self-aligns with the second plurality of transparent protrusions 112 so that they are positioned adjacent and in contact with each other and form a plurality of openings 109. In particular, self-aligning in accordance with the present invention includes first transparent portion 102 having the first plurality of transparent protrusions 110 zippering with second transparent portion 103 having the second plurality of transparent protrusions 112 to form the openings 109 in the optical device 100. More specifically, referring to FIG. 2A, the first plurality of transparent protrusions 110 include at least one surface 105 designed to mate with at least one surface 107 of the second plurality of transparent protrusions 112. The mating surfaces 105 and 107 self-align, i.e., fit together in one configuration which forms the plurality of openings 109 having a desired size, shape, and aspect ratio. As shown in FIGS. 2A-C, transparent portions 102 and 103 are identical to each other, but transparent portion 102 is inverted with respect to transparent portion 103.

Suitable transparent materials for the first and second transparent portions 102 and 103 include, but are not limited to, polymer sheets or films, such as acrylics, polycarbonates, vinyls, polyethylene terephthalate ("PET"), and polyethylene naphthalate ("PEN"). Although in the embodiment shown in FIGS. 2A-C, the first portion 102 and first plurality of protrusions 110 are formed of one material, the first plurality of transparent protrusions 110 can be formed of a different material than the remainder of transparent portion 102. Similarly, the second plurality of transparent protrusions 112 can be formed of a different material than the remainder of transparent portion 103. The protrusions 110 and 112 can have a triangular cross-sectional shape as shown in FIGS. 2A-C, although other cross-sectional shapes such as trapezoidal, rectangular, or square, are possible. If the cross-sectional shape of the transparent protrusions 110 and 112 is triangular, the triangle can be a right triangle, or it can be tilted, asymmetric, or otherwise formed so that the ambient light absorption, the display light emission, or both, can be asymmetric. The angle of the sidewalls of the triangular-shaped protrusions in FIGS. 2A-C and 3 is from about 3° to about 80°, most preferably from about 5° to about 50°, from a line parallel to the optical axis O. Furthermore, although the sides of the protrusions 110 and 112 are shown as straight in FIGS. 2A-C, and 3, other embodiments are possible, including curved sides (see FIGS. 8A, 8B, and 9, and the description below).

In one embodiment, the first and second transparent portions 102 and 103 having their first and second plurality of transparent protrusions 110 and 112, respectively, are produced with a microreplication process. In particular, in one embodiment, the first and second portions 102 and 103 and protrusions 110 and 112 are fabricated from UV curable resin in a casting process, or they can be made with a molding process such as injection molding or embossing (e.g., embossing or continuous embossing), using any suitable material, such as acrylic, polycarbonate, or vinyl. In another embodiment, each of the transparent portions 102 and 103 can be formed in a two-step process in which a substrate of the transparent portion 102,103 is formed and then the protrusions 110, 112, respectively, (which may be different materials than the substrate portions) are formed on top of the substrate portion.

In a further embodiment, the refractive index of the first and second transparent portions 102 and 103 and, first and second plurality of transparent protrusions 110 and 112 is between 1.4 and 1.6, although lower indices perform better as described below. In a further embodiment, the refractive index of the first and second transparent portions 102 and 103 and protrusions 110 and 112 is substantially equal. In yet another embodiment, the first and second plurality of transparent protrusions 110 and 112 have an aspect ratio of from about 1 to about 5. As used herein, aspect ratio is defined, for a two-dimensional shape, as the ratio of its longer dimension to its shorter dimension. It is also applied to two characteristic dimensions of a three-dimensional shape, especially for the longest and shortest 'axes' or for symmetrical objects (e.g. rods) that are described by just two measures (e.g. length and diameter). Normally the first and second transparent portions 102 and 103 have minimal amounts of haze, although some haze may be beneficial to overcome the louvering effects imparted by the opaque material 114 on the light emitted by the display panel. Furthermore, the normally transparent first and second portions 102 and 103 can have bulk diffusive properties obtained by dispersing particles of a different refractive index throughout the first and second transparent portions 102 and 103, including the first and second plurality of transparent protrusions 110 and 112.

The transmittance of the first and second transparent portions 102 and 103 should not be spectrally dependent, but instead should transmit all wavelengths approximately the same between 400 nm and 700 nm so that it does not impart a strong tint to the viewed image. However, if a mild tint is imparted, the spectral emissive properties of the display panel can be changed to reduce or eliminate the effect. Alternately, tinting can be intentionally added to the first and second transparent portions 102 and 103 to compensate for spectral irregularities of the light emitted by the display panel. Furthermore, IR absorbing additives can be provided that reduce the amount of infra-red light that is emitted by the display. Such IR emissions have been known to disrupt IR-based handheld remote controls, and blocking these emissions would be beneficial.

Referring to FIG. 2B, the first and second transparent portions 102 and 103 form a plurality of rectangular-shaped openings (in cross-section) 109 in the optical device 100. As shown in FIG. 2B, in this embodiment, the rectangular-shaped openings 109 are positioned substantially centrally between the first surface 106 and second surface 108. However, in alternative embodiments, the openings may be positioned in any desired location within the optical device 100 and may extend substantially from the first surface 106 to the second surface 108.

Figure 9:
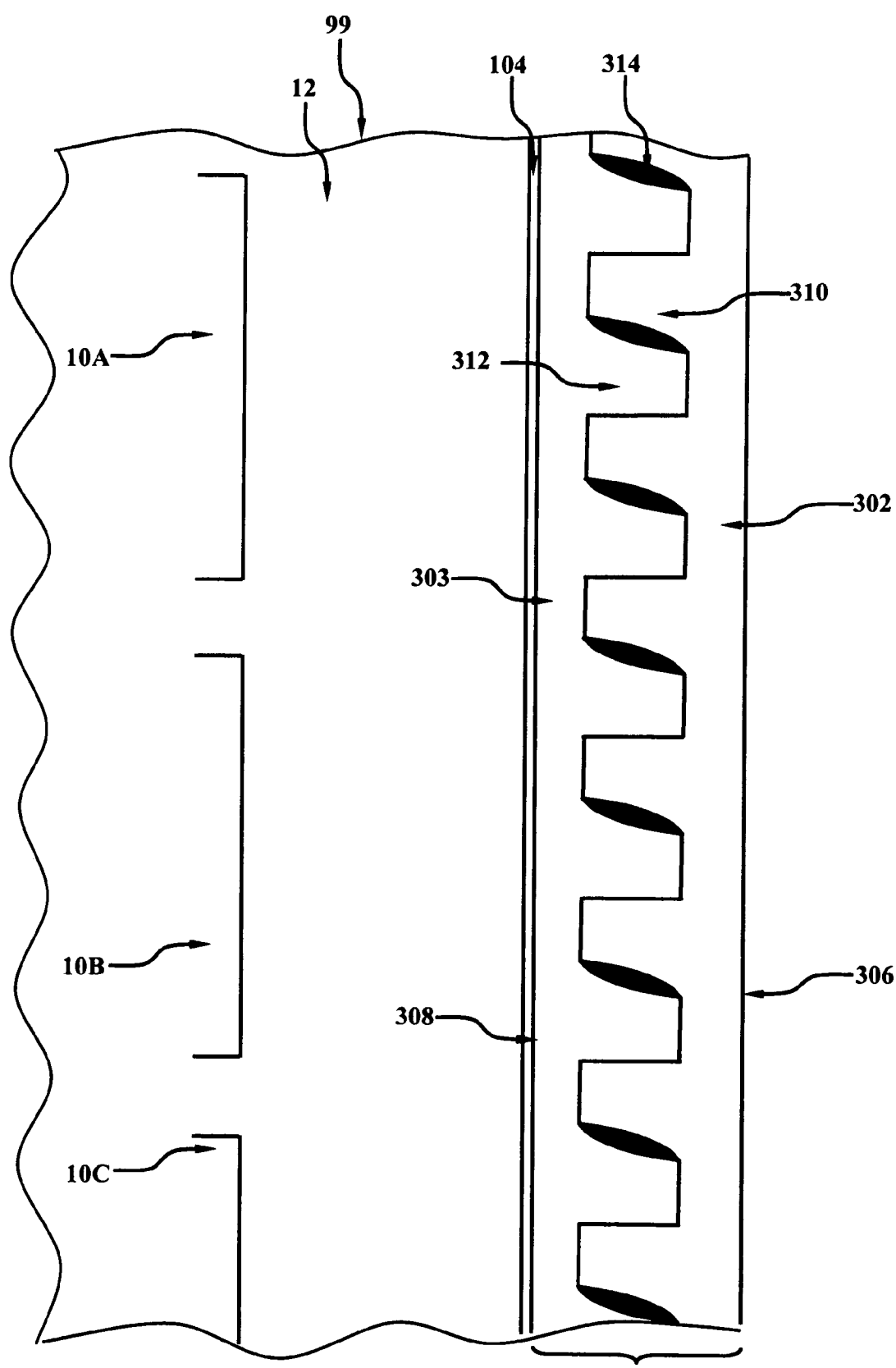
FIG. 9 is a partial, cross-sectional view of an optical device and system in accordance with exemplary embodiments of the present invention in which the sides of the opaque sections are curved.

Although in this embodiment of the present invention, the optical device 100 includes rectangular-shaped openings (in cross-section), other shapes of openings may be used including, but not limited to, triangles, square, trapezoidal, hexagonal, octagonal, and other polygons, and their side and base surfaces can be flat as shown in FIGS. 2A-C and 3, or one of more of them can be curved or non-linear. An example of curved openings is shown in FIG. 9.

Referring to FIGS. 2C and 3, the rectangular-shaped openings are filled with an opaque material 114 to create alternating transparent and opaque sections in the optical device 100. In this embodiment, the opaque material 114 is an adhesive and adheres the first and second transparent portions 102 and 103. Alternatively, the opaque material 114 may not be an adhesive and a separate transparent adhesive can be used to adhere the first and second transparent portions 102 and 103. In another embodiment, the rectangular-shaped openings can be partially filled with an opaque material 114 as long as the sides of the openings are coated with the opaque material. In this case the void behind the partially filled rectangular-shaped openings could be filled with a second material, or it can be left vacant. The opaque material 114 has a light absorbing characteristic. Also referring to FIG. 3, the distance D between adjacent opaque sections 114 is from about 0.03 mm to about 5 mm, the length A of the opaque sections 114 is from about 0.03 mm to about 5 mm, and the width B of the opaque sections 114 is from about 0.01 mm to about 2 mm. Suitable opaque materials 114 include, but are not limited to, a UV curable resin, a solvent-cured material, a paint, a heat-curing material, a cyanoacrylate adhesive such as Loctite's Black Max, or any other material that polymerizes without the use of UV radiation. In one embodiment, light absorbing particles are mixed into, for example, a UV curable resin to form the opaque material 114. Suitable light absorbing particles include, but are not limited to, carbon, dyes, inks, or stains.

In one embodiment, the opaque material 114 has a refractive index of from about 1.4 to about 1.6. In one particular embodiment of the present invention, the refractive index of the first and second transparent portions 102 and 103 (including the first and second plurality of transparent protrusions 110 and 112), and opaque material 114 are substantially equal. This reduces fresnel reflection of light (both ambient light and light emitted from the display) at the interface between the blackened regions 114 and the transparent protrusions 110 and 112. In one embodiment, the difference in refractive indices between the first and second transparent portions 102 and 103 with protrusions 110 and 112 and the opaque material 114 is 0.03 or less. In another embodiment, the refractive index of the opaque material 114 is greater than the refractive index of the first and second transparent portions 102 and 103 with protrusions 110 and 112 so that Total Internal Reflection of ambient light or light emitted from a pixel 10 does not occur at the interface between the two materials.

In addition, the opaque material 114 preferably has an optical density greater than 1.0, most preferably greater than 3.0, and superior ambient light absorbance is achieved when the optical density is 5.0 or more.

In yet another embodiment, the opaque material 114 is composed of a dielectric material. However, in alternate embodiments, the opaque material may contain metallic components, particularly light-absorbing ferrous materials that can be magnetically mixed, dispersed, or deposited throughout a dielectric matrix of a supporting medium. The opaque material 114 may also contain particles of metallic oxides.

In a further embodiment, opaque regions 114 can be tailored to preferentially absorb ambient light from a predetermined direction, such as from overhead.

Figure 5:
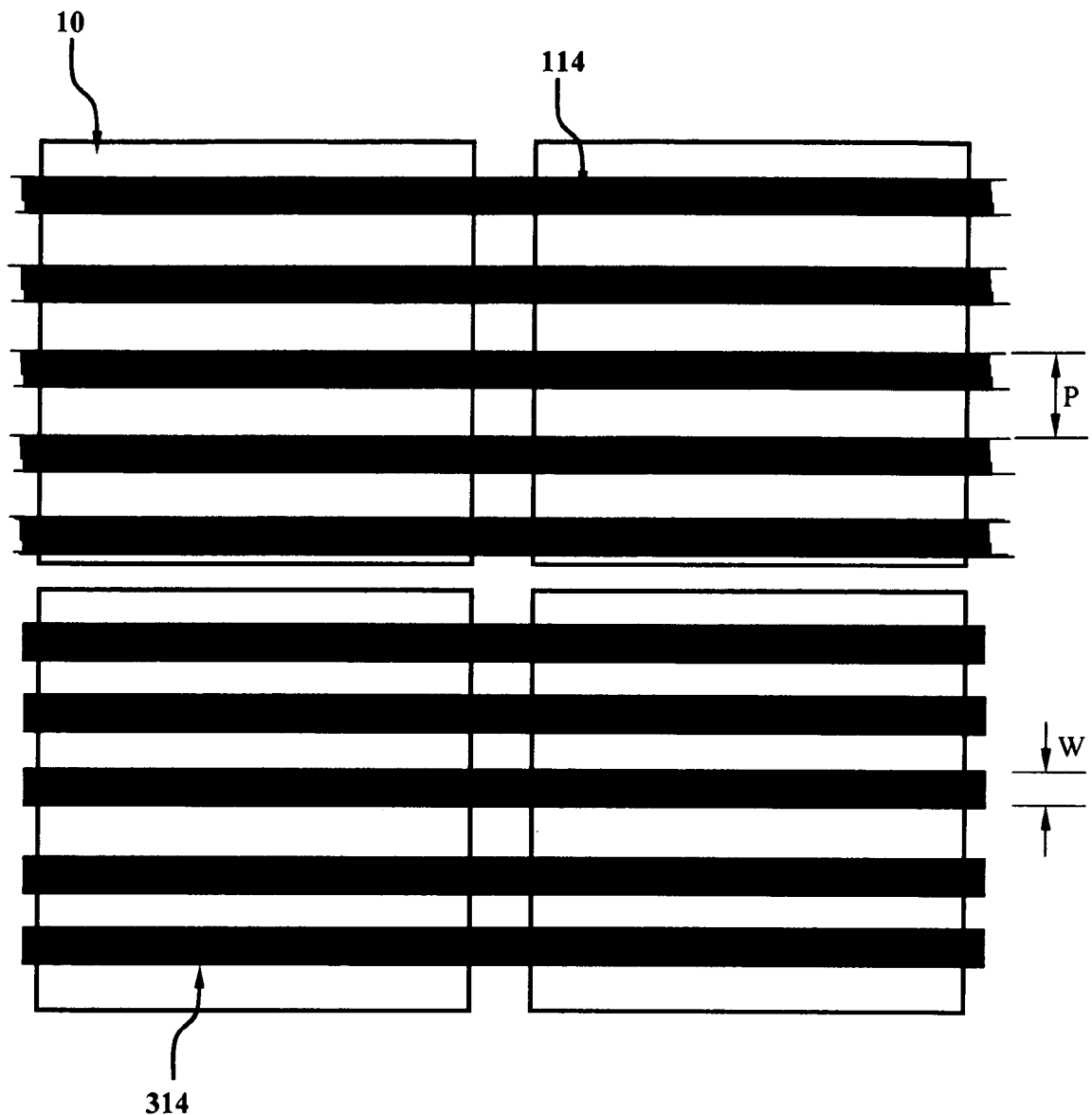
FIG. 5 is a partial, front view of an optical device and system in accordance with exemplary embodiments of the present invention which includes an optical device installed atop the pixels of a display panel in which the optical device runs horizontally.
Figure 6:
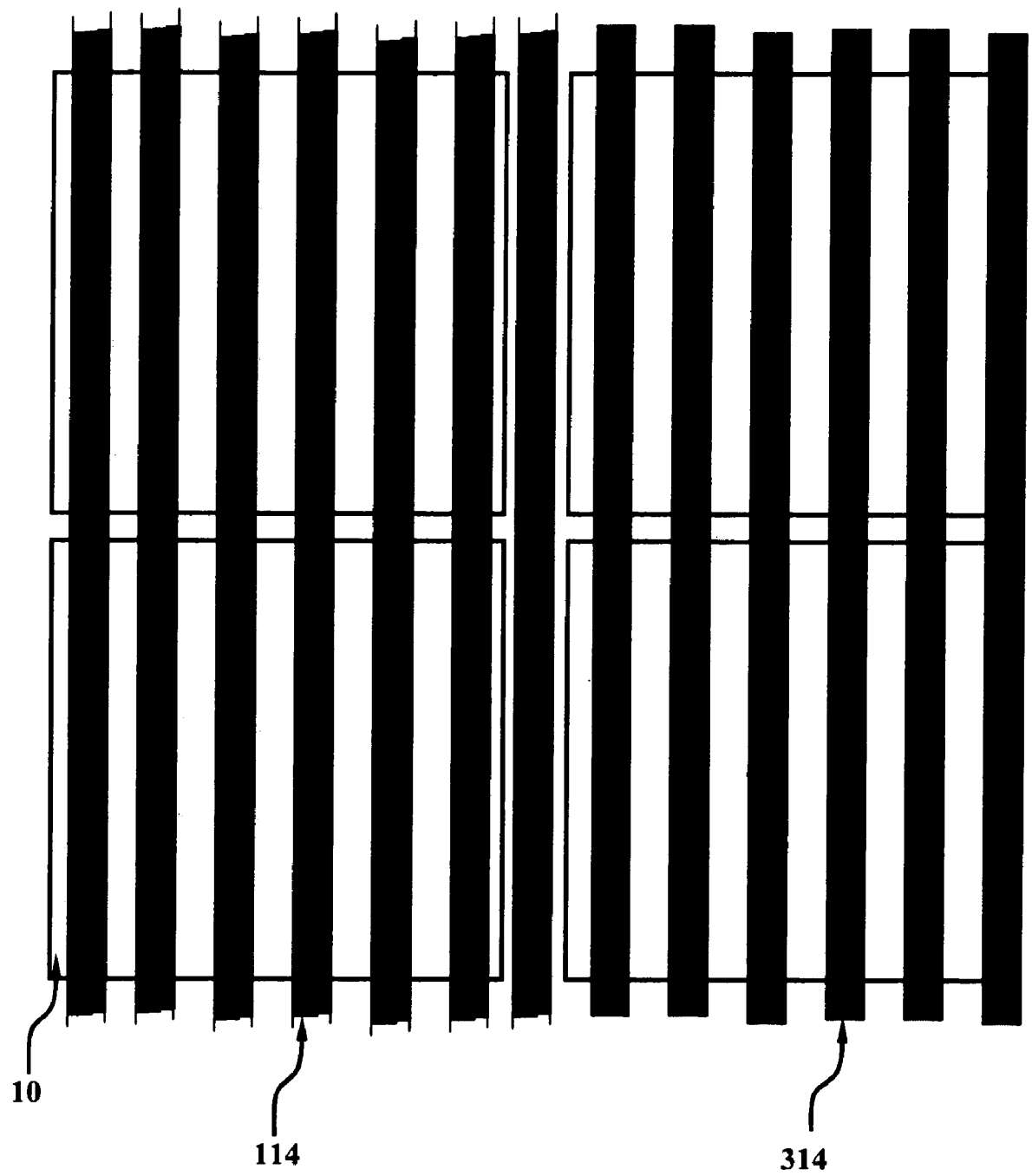
FIG. 6 is a partial, front view of an optical device and system in accordance with exemplary embodiments of the present invention which includes an optical device installed atop the pixels of a display panel in which the optical device runs vertically.

In one embodiment of the present invention, as illustrated in FIG. 5, the openings filled with opaque material 114 extend horizontally across the optical device 100. In another embodiment, as illustrated in FIG. 6, the openings filled with opaque material 114 extend vertically across the optical device 100. In yet another embodiment, the optical device 100 includes multiple sets of openings. For example, the multiple sets of openings can be positioned such that they are cross-hatched (bi-directional) wherein two sets of openings are orthogonal to each other or three sets of openings can be positioned so that they are rotationally 60 degrees apart. Furthermore, two or more sets of optical devices 100 can be used in a cascade arrangement, either crossed or running parallel (either vertically, horizontally, or some other arbitrary angle to minimize moiré between the optical device 100 and the pixels 10).

FIG. 5 is a front view of the present invention, showing the pixels 10 of the display panel in the background behind the opaque material 114, 314 (described below). A duty factor of the opaque material 114, 314 can be defined as the ratio of the width of the widest part of an opaque material 114, 314, designated as "W" in FIG. 5 divided by the pitch, P. That is, the duty factor DF=W/P. Larger duty factors allow for greater light absorption while smaller duty factors allow for greater display light transmittance through the optical device 100. A typical value for DF is 0.15, although it can range from about 0.05 up to about 0.85.

The absorbance of the opaque material 114 should not be spectrally dependent, but instead should absorb all wavelengths approximately the same between 400 nm and 700 nm so that it does not impart a strong tint to the viewed image. However, if a mild tint is imparted, the spectral emissive properties of the display panel can be intentionally changed somewhat to compensate for spectral irregularities of the light emitted by the display panel. Furthermore, IR absorbing additives can be added to the opaque material 114 that reduce the amount of infra-red light that is emitted by the display. Such IR emissions have been known to disrupt IR-based handheld remote controls, and blocking these emissions would be beneficial.

In another embodiment, the openings filled with opaque material 114 have an aspect ratio, defined as the ratio of A/B (see FIG. 3), of greater than one for optimal ambient light absorption as described below. However, the aspect ratio of the openings filled with opaque material 114 may be from about 0.5 to 10. The material of the opaque material 114, the first and second transparent portions 102 and 103, or both can have elastomeric properties to facilitate molding of the high aspect ratio protrusions 110 and 112.

Referring to FIG. 5, in one embodiment, the optical device 100 has a pitch P of from about 10 µm to about 2 mm, which should be much less than the width of a pixel 10 so that moiré interference does not occur. The pitch of the optical device can be such that there are at least two, and preferably five or more, opaque regions 114 per pixel 10 of the viewing display.

In one exemplary embodiment, the thickness of the optical device 100 is less than about 1 mm, and can be in the range of from about 0.1 mm to about 2.5 mm. In general it is desirable to keep the thickness of the optical device 100 as small as possible, in keeping with the trend to thinner displays.

Referring to FIG. 3, the optical device 100 is proximate the front face panel 12 of a viewing display. As shown in FIG. 3, the optical device 100 and second surface 108 of the viewing display are in optical contact. However, another layer may be present between the optical device 100 and viewing display, such as an adhesive layer 104 which adheres surface 108 of the optical device 100 to an output surface of a front face panel 12 of a viewing display. The adhesive layer 104 can be a pressure sensitive adhesive (PSA), although other types of adhesives can be used as well. The transmittance of the adhesive layer 104 should not be spectrally dependent, but instead should transmit all wavelengths approximately the same between 400 nm and 700 nm so that it does not impart a strong tint to the viewed image. However, if a mild tint is imparted to the adhesive layer 104, the spectral emissive properties of the display panel can be changed. That is, tinting can be intentionally added to the adhesive layer 104 to compensate for spectral irregularities of the light emitted by the display panel. Furthermore, IR absorbing additives can be added to the adhesive layer 104 to reduce the amount of infra-red light that is emitted by the display. Such IR emissions have been known to disrupt IR-based handheld remote controls, and blocking these emissions would be beneficial.

In one exemplary embodiment, the refractive index of the adhesive layer 104 is between that of the second portion 103 and the output surface of the viewing display 12 to reduce unwanted fresnel reflections at these interfaces.

Figure 7:
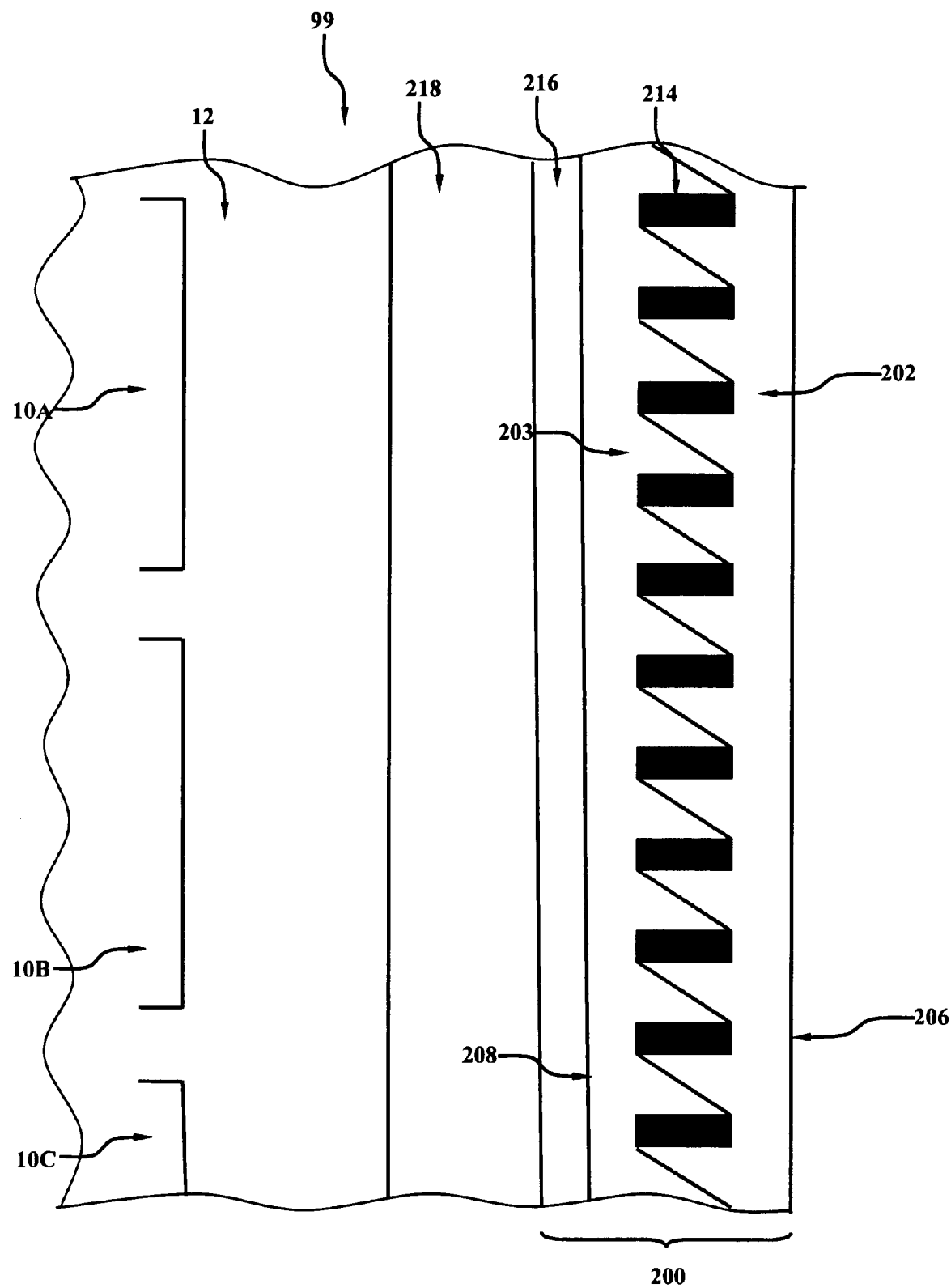
FIG. 7 is a partial, cross-sectional view of an optical device and system in accordance with alternative embodiments of the present invention.

Alternatively, as shown in FIG. 7, optical device 200 can be optionally installed onto a light-transmissive sheet of material 216 that is then placed in front of the display panel, leaving an air gap 218 between the optical device 200 and the viewing display. In another embodiment, the light-transmissive sheet of material 216 can be placed adjacent front face panel 12 without leaving an air gap.

In one embodiment, the viewing display is a flat panel display. Suitable viewing displays include, but are not limited to, pixelated displays, such as plasma display panels, LCD display panels, iLED display panels, and OLED display panels. FIGS. 3-7 and 9 show examples of pixelated displays including pixels 10A, 10B, and 10C. In another embodiment, the display panel is curved, and the optical device 100 of the present invention can be formed to fit the curvature of such a non-flat device.

In yet another embodiment, the optical device can be used as a privacy film, which when installed in front of a display restricts the angular emission profile width, so that, e.g., somebody sitting next to you on a plane, or looking over your shoulder, cannot view what you are viewing.

In one embodiment, the first surface 106 of the optical device 100, i.e. that which faces the viewer, is treated with an anti-reflective coating or a subwavelength antireflective microstructure to minimize reflections from surface 106. Furthermore, in another embodiment, first surface 106 has a diffusive surface relief texture to minimize specular glare.

Figure 8A:
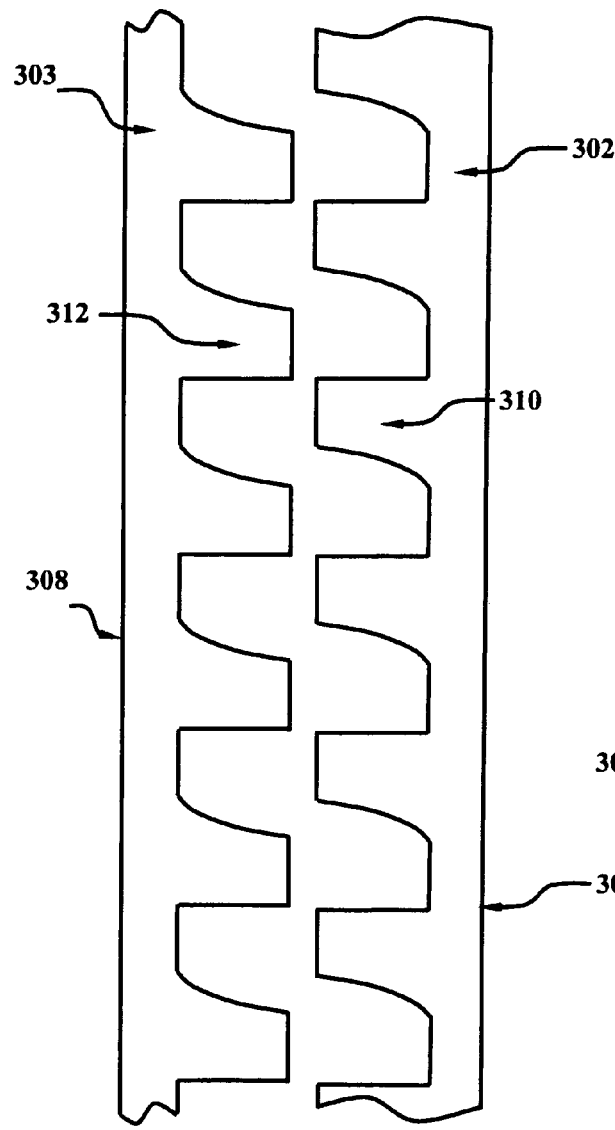
FIGS. 8A-B are partial, cross-sectional views of an optical device in accordance with exemplary embodiments of the present invention in which the sides of the opaque sections are curved.
Figure 8B:
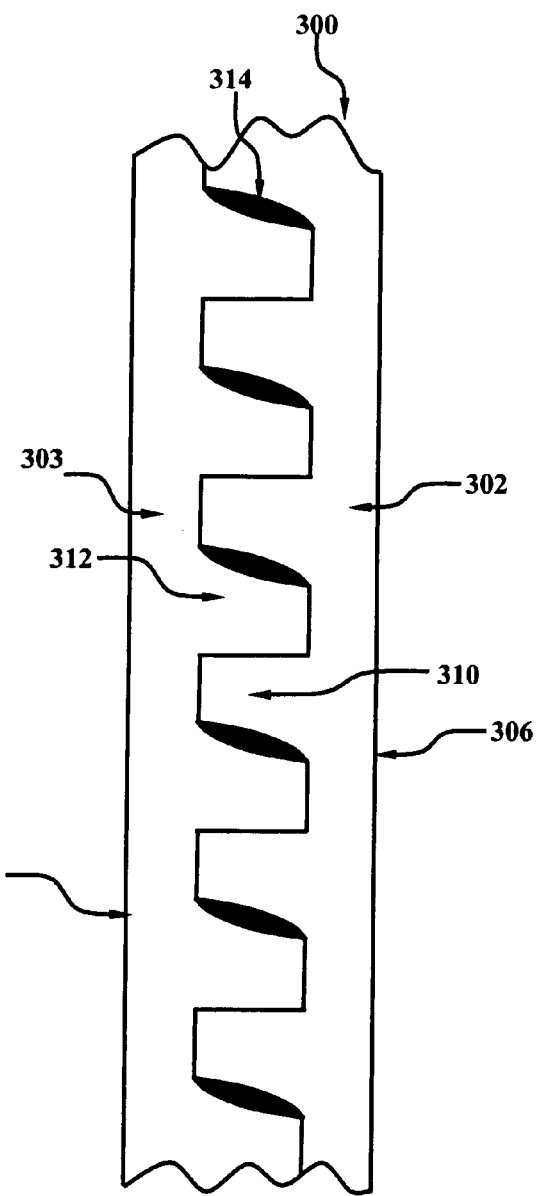

One alternate optical device configuration is shown in FIGS. 8A, 8B, and 9 where the transparent protrusions 310 and 312 have at least one side that is non-linear in cross-section or curved. Non-linear sides can have several potential advantages over a linear cross-sectional shape, such as the ability to fabricate molds or tools quickly and at a lower cost, faster and less costly molding processes, and better optical performance of the finished part.

Referring back to FIG. 3, the operation of the device 100 can be illustrated by describing how a few different types of rays interact with the device 100. Ambient light ray 130 originates at an ambient light source, such as an overhead room lamp, or it could be reflected off of a wall of a room of the ambient environment. Regardless of its source, it is highly desirable to prevent ambient light ray 130 from being reflected back into the viewing environment. Ambient light ray 130 enters into the transparent first portion 102. After propagating some distance into the transparent first portion 102, the ambient light ray 130 becomes incident upon an opening filled with opaque material 114 at location 132. If the refractive index of the opaque material 114 is substantially the same as the refractive index of the transparent first portion 102, then ambient light ray 130 will be substantially absorbed at location 132, regardless of the angle of incidence of the ambient light ray 130 at location 132. In this way, good ambient light absorption is achieved. Moreover, when the values for refractive indices of transparent portions 102 and 103 and first and second plurality of transparent protrusions 110 and 112 are lower, e.g., 1.4, ambient light in the device 100 will generally be less parallel to the optical axis O, and will have a better chance of hitting the side of an opaque region 114 to be absorbed.

Ambient light ray 130 also illustrates an advantage of the present invention over the prior art. If the openings filled with opaque material 114 were instead replaced with thin opaque stripes 14 of the prior art, then ray 130 would not be absorbed at location 132, but instead would propagate along path 131 and pass through transparent portion 103 at location 133. This ray would then be backreflected by pixel 10A, seen by a viewer, and result in an apparent reduction in contrast. In particular, the thickness "A" of the opaque regions in the prior art is very small, and essentially there are no sides that can absorb ambient light (ray 130 is shown to be incident on the side at location 132). In contrast, the opaque regions in the present invention provide for a substantial side area that can also absorb ambient light.

Now consider light rays emitted by the display panel pixels themselves, such as light rays 134 and 136 emitted by pixel 10B at locations 138 and 140. Emitted light ray 134 is absorbed by an opening filled with opaque material 114 at location 142, and reduces the apparent brightness of the display panel. Light ray 136 passes through the optical device 100 and contributes to the brightness of the display panel. The optical device 100 of the present invention will reduce the amount of transmitted light (emitted by the display panel) by approximately 20%, although in some cases it may approach 80%, or be as little as 5%, depending on the ambient light absorbing characteristics of the film.

Light ray 144 exits the pixel 10B from position 146 at an oblique angle and is subsequently incident on the side of an opening filled with opaque material 114 at location 148. Light ray 144 is nominally absorbed, but if the refractive index of the transparent portion 103 is different than the refractive of the opaque material 114, then a reflection ray 150 exists. To a viewer, reflection ray 150 appears to originate at pixel 10C, by way of virtual ray 152 which appears to originate at location 154. To the viewer, then, pixel 10B and pixel 10C appear to overlap to some extent, and results in a phenomenon that will be referred to as "pixel blur." This pixel blur manifests itself as a reduction in spatial resolution of the display panel.

However, pixel blur can be easily remedied by substantially matching the refractive index of the opaque material 114 to the refractive index of the transparent protrusions 110 and 112, as this will reduce or eliminate the Fresnel reflection, or Total Internal Reflection (TIR) that can occur at the point of incidence.

Figure 4:
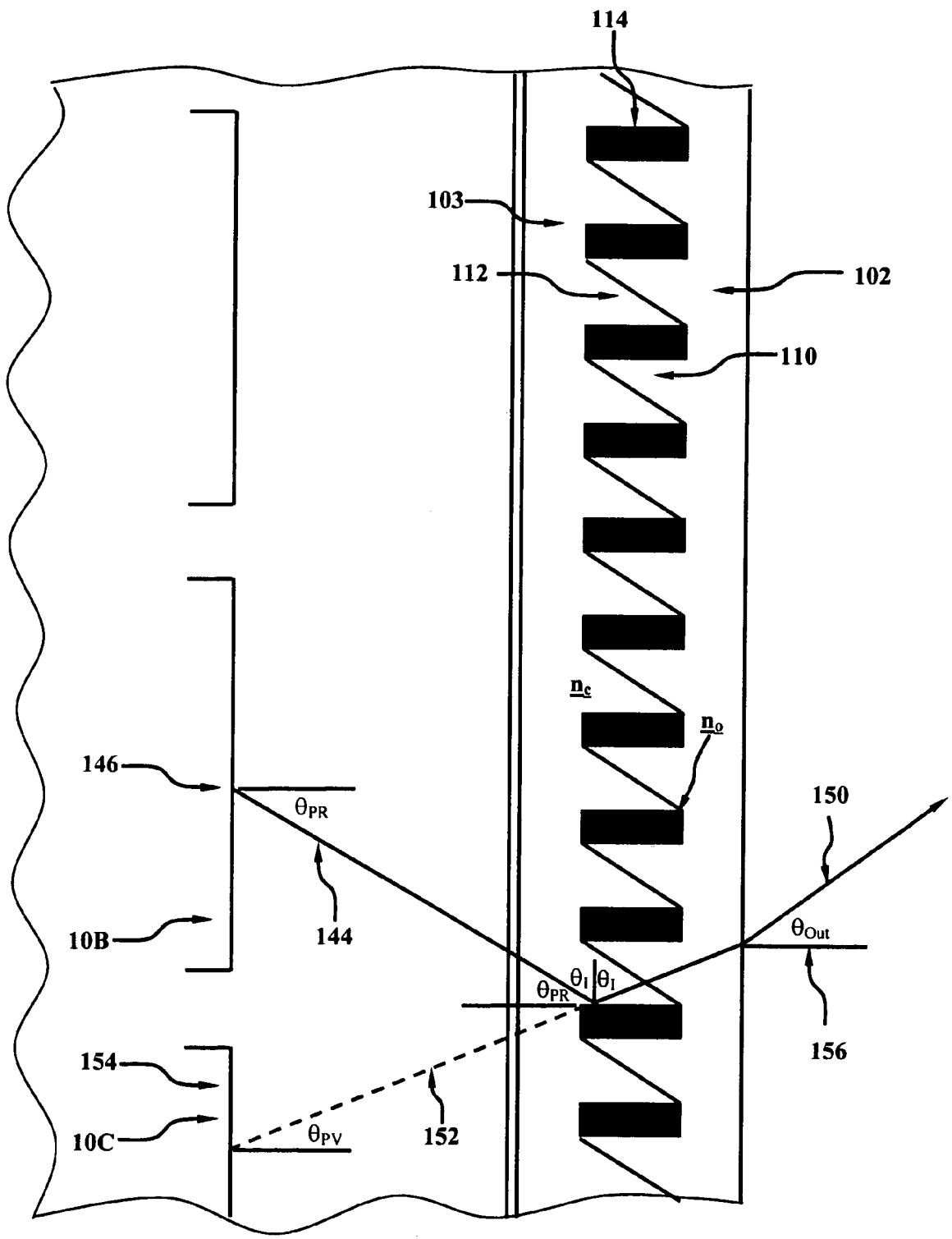
FIG. 4 is a partial cross-sectional view of the optical device and system illustrated in FIG. 3 showing the various rays and symbols used to analyze and eliminate the pixel-ghosting problem that arises in the present invention.

The analysis of the light reflection at the interface between the opaque material 114 and the transparent portions 102 and 103, and the transparent protrusions 110 and 112, can be facilitated by referring to FIG. 4. In this figure, the following list of variables are utilized in the optical analysis:

$\theta_{PR}$ is the emission angle of real ray 144 as it leaves a pixel 10B at location 146;

$\theta_I$ is the angle of incidence that the emitted ray 144 makes at the interface between the opaque material 114 and the transparent protrusion 112;

$\theta_T$ (not shown) is the angle of exittance of the light ray transmitted into the opaque material 114;

$\theta_{Out}$ is the final output angle of the light ray 150 as it leaves the display panel relative to a normal line 156;

$\theta_{PV}$ is the apparent emission angle of virtual ray 152 as it leaves a pixel 10C at location 154;

$n_c$ is the refractive index of the transparent material of the protrusions 110 and 112; and $n_o$ is the refractive index of the opaque material 114.

By inspection, $\theta_{PV} = \theta_{PR}$, and from Snell's Law $$\sin(\theta_{Out}) = n_C \sin(\theta_{PV}) \qquad \text{(Equation 1)}$$

$$\theta_{Out} = A\sin[n_C \sin(\theta_{PV})] \qquad \text{(Equation 2)}$$

$$n_C \sin(\theta_I) = n_O \sin(\theta_T) \qquad \text{(Equation 3)}$$

$$\theta_T = A\sin[n_C \sin(\theta_I)/n_O] \qquad \text{(Equation 4)}$$

As discussed above, it is highly desirable to minimize the power in reflected rays 150, which is accomplished by controlling the relative refractive indices of the opaque material 114 and the transparent portions 102 and 103 and protrusions 110 and 112. The amount of power in the reflected rays 150 is known to follow the Fresnel reflection equations. There are two Fresnel equations which are used to compute the amount of reflected power: one for light whose E-field is oriented perpendicular to the plane of incidence (s-polarization), and another for light whose E-field is oriented parallel to the plane of incidence (p-polarization). These two equations are:

$$R_S = \left[\frac{n_C\cos(\theta_I) - n_O\cos(\theta_T)}{n_C\cos(\theta_I) + n_O\cos(\theta_T)}\right]^2 \qquad \text{(Equation 5)}$$

$$R_P = \left[\frac{n_C\cos(\theta_T) + n_O\cos(\theta_I)}{n_C\cos(\theta_T) - n_O\cos(\theta_I)}\right]^2 \qquad \text{(Equation 6)}$$

Given that the light emitted by a display panel's pixel is generally randomly polarized, containing 50% P-polarization and 50% S-polarization, the total reflectance becomes an average of these two:

$$\% R = (R_S + R_P)/2 \times 100\% \qquad \text{(Equation 7)}$$

As a general rule of thumb, for the pixel-blur to be reduced to an acceptable level, the amount of power in the reflected ray 150 should be less than 10% of the amount of power in a ray 144 emitted by a pixel, but preferably the amount of reflected power should be less than 2%, for any given angle of incidence. This condition occurs when the refractive index difference is less than 0.01, although differences as high as 0.03 may be acceptable for some applications. Furthermore, the refractive index of the opaque material 114 should be greater than the refractive index of the transparent portions 102 and 103 and protrusions 110 and 112 in order to avoid total internal reflectance (TIR) conditions which can occur at large values of $\theta_I$. TIR can produce 100% reflectance, which clearly will result in objectionable pixel blur.

Referring to FIGS. 8A, 8B, and 9, an alternate configuration is shown in which at least one of the sides of the protrusions 310 and 312 is curved. The sides of the resulting opaque material 314 areas are now substantially curved in cross-section. The operation of this configuration follows that as described in connection with FIGS. 3 and 4, including the relative refractive index values of the opaque material and the transparent portions 102 and 103 and protrusions 110 and 112.

Figure 10:
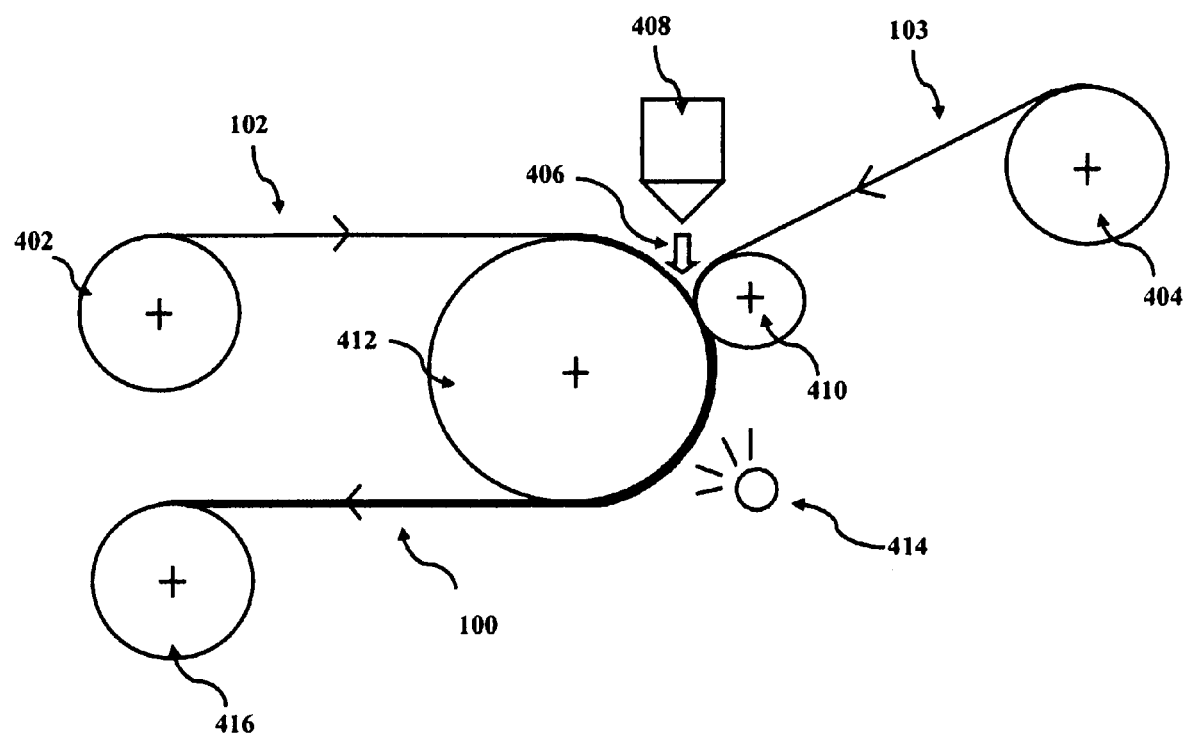
FIG. 10 is a schematic of a method for making an optical device in accordance with exemplary embodiments of the present invention.

Referring to FIG. 10, one embodiment is shown relating to a method for fabricating an optical device 100 of the present invention. As described above, the first and second transparent portions 102 and 103 with protrusions 110 and 112 are produced with a microreplication process. In particular, in one embodiment, the first and second portions 102 and 103 with protrusions 110 and 112 are fabricated from UV curable resin in a casting process, or they can be made with a molding process such as injection molding or embossing (e.g., embossing or continuous embossing), using any suitable material, such as acrylic, polycarbonate, or vinyl. In accordance with one embodiment, the first and second transparent portions 102 and 103 are cast with a casting process in which a UV curable resin is placed into a microstructured mold and then the UV curable resin is exposed to UV light which polymerizes the resin and causes it to harden. The mold is then removed. This process is typically done in a continuous roll-to-roll process in which the mold is in the form of a cylinder in which a negative of the plurality of protrusions 110 and 112 is formed into the surface, and then the UV resin is continually rolled over the mold's surface as it rotates about its axis.

Alternately, the protrusions 110 and 112 of the first and second transparent portions 102 and 103 can be formed by the use of an embossing molding process, a compression molding process, or an injection molding process.

The method further involves positioning the first transparent portion 102, which is in the form of a film, on a first feed roll 402 and positioning the second transparent portion 103, which is also in the form of a film, on a second feed roll 404. The first and second transparent portions 102 and 103 are joined at point 406, wherein the first plurality of transparent protrusions are positioned adjacent the second plurality of transparent protrusions to form the plurality of spaced openings 109. The openings are filled with opaque material 114. A reservoir 408 of opaque adhesive material 114 is positioned to dispense the material 114. In this embodiment, reservoir 408 is positioned to gravity feed the opaque adhesive material, although other configurations may be used, for example, a pump dispenser or system, or capillary action. The opaque adhesive material creates a bond between the first and second portions by at least partially filling the plurality of spaced openings formed when the first and second transparent portions are joined and creating alternating opaque and transparent sections. A pair of nip rollers 410 and 412 is used to form a nip to force the opaque material into the openings (and leave the transparent protrusions 110 and 112 substantially free of the opaque material 114) as the optical device 100, with a bead of opaque material at the nip, passes between the rollers. As used herein, a nip is the point of intersection between two rollers. As the optical device 100 moves around roller 412 it is cured with an ultraviolet source 414 and the finished product is wound onto roll 416. Although FIG. 10 shows an ultraviolet source 414, if non-UV curable materials are used as the opaque material 114 an ultraviolet source would be unnecessary. Alternatively, heat could be applied through IR lamps, air, or by heating the roll 412.

Filling can also be achieved by other methods known to one of ordinary skill in the art. In particular, the opaque material, 114, can be installed between the protrusions 110 and 112, respectively, in any of a number of different ways. By way of example only, the openings 109 and transparent portions 102 and 103 can both be sprayed with the opaque material, and the transparent portions 102 and 103 can be wiped or squeegeed so that they are free of the opaque material, with the result that the opaque material is only present in the openings 109. Alternately, the opaque material can simply be squeegeed across the openings 109 and transparent portions 102 and 103 with the result that the transparent portions are free of the opaque material but the opaque material will be present in the openings 109. Then the first and second transparent portions can be fit together such that the protrusions 110 and 112 self-align.

The surface 108 of the transparent portion 103 can then be attached to the output surface of the viewing display 12 using an adhesive 104, resulting in the final construction shown in FIGS. 3-4.

Although the above methods have been described with reference to optical device 100, the same methods would apply to optical devices 200 and 300, with the following exceptions. With regard to optical device 200, the method would further include installing the optical device 200 onto a light-transmissive sheet of material 216 that is then placed in front of the display panel; leaving an air gap 218 between the optical device 200 and the viewing display. With regard to optical device 300, the microreplication process is modified to produce at least one curved surface on the protrusions 310 and 312.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An optical device having first and second opposing surfaces, wherein the optical device comprises a first portion having a first plurality of transparent protrusions extending from the first surface and a second portion having a second plurality of transparent protrusions extending from the second surface, wherein the first plurality of transparent protrusions directly engage to mate and self-align with the second plurality of transparent protrusions to form a plurality of spaced openings, said openings being at least partially filled with an opaque material and positioned to create alternating opaque and transparent sections.

2. The optical device according to claim 1, wherein the refractive index of the first and second portions is substantially equal.

3. The optical device according to claim 1, wherein the refractive index of the opaque material is within 0.03 of the refractive index of the first and second plurality of transparent protrusions.

4. The optical device according to claim 1, wherein the refractive index of the opaque material is greater than the refractive index of the first and second plurality of transparent protrusions.

5. The optical device according to claim 1, wherein the first and second portions are substantially the same in cross-section, but the first portion is inverted as compared to the second portion.

6. The optical device according to claim 1, wherein the first plurality of transparent protrusions includes at least one mating surface that self-aligns with at least one mating surface of the second plurality of protrusions.

7. The optical device according to claim 1, wherein the first and second plurality of transparent protrusions have a cross-sectional shape which is at least one of triangular, trapezoidal, rectangular, and square.

8. The optical device according to claim 1, wherein the plurality of openings have a cross-sectional shape which is at least one of triangular, trapezoidal, rectangular, and square.

9. The optical device according to claim 1, wherein the first and second plurality of transparent protrusions have an aspect ratio of from about 1 to about 5.

10. The optical device according to claim 1, wherein the opaque sections have an aspect ratio of from about 0.5 to about 10.

11. The optical device according to claim 1, wherein the duty factor of the opaque sections is from about 0.05 to about 0.85.

12. The optical device according to claim 1, wherein the first and second plurality of transparent protrusions extend horizontally in the plane of the first or second surface of the optical device.

13. The optical device according to claim 1, wherein the first and second plurality of transparent protrusions extend vertically in the plane of the first or second surface of the optical device.

14. The optical device according to claim 1, wherein the thickness of the optical device is from about 0.1 mm to about 2.5 mm.

15. The optical device according to claim 1, wherein sides of the opaque sections are linear.

16. The optical device according to claim 1, wherein sides of the opaque sections are curved.

17. The optical device according to claim 1 further comprising:
a transparent layer adjacent at least a portion of the first or second surface of the optical device.

18. A system comprising:
an optical device having first and second opposing surfaces, wherein the optical device comprises a first portion having a first plurality of transparent protrusions extending from the first surface and a second portion having a second plurality of transparent protrusions extending from the second surface, wherein the first plurality of transparent protrusions directly engage to mate and self-align with the second plurality of transparent protrusions to form a plurality of spaced openings, said openings being at least partially filled with an opaque material and positioned to create alternating opaque and transparent sections; and
a viewing display, wherein the second surface of the optical device is proximate at least a portion of the viewing display.

19. The system according to claim 18, wherein the refractive index of the first and second portions is substantially equal.

20. The system according to claim 18, wherein the refractive index of the opaque material is within 0.03 of the refractive index of the first and second plurality of transparent protrusions.

21. The system according to claim 18, wherein the refractive index of the opaque material is greater than the refractive index of the first and second plurality of transparent protrusions.

22. The system according to claim 18, wherein the first and second portions are substantially the same in cross-section, but the first portion is inverted as compared to the second portion.

23. The system according to claim 18, wherein the first plurality of transparent protrusions includes at least one mating surface that self-aligns with at least one mating surface of the second plurality of protrusions.

24. The system according to claim 18, wherein the first and second plurality of transparent protrusions have a cross-sectional shape which is at least one of triangular, trapezoidal, rectangular, and square.

25. The system according to claim 18, wherein the plurality of openings have a cross-sectional shape which is at least one of triangular, trapezoidal, rectangular, and square.

26. The system according to claim 18, wherein the first and second plurality of transparent protrusions have an aspect ratio of from about 1 to about 5.

27. The system according to claim 18, wherein the opaque sections have an aspect ratio of from about 0.5 to about 10.

28. The system according to claim 18, wherein the duty factor of the opaque sections is from about 0.05 to about 0.85.

29. The system according to claim 18, wherein the first and second plurality of transparent protrusions extend horizontally in the plane of the first or second surface of the optical device.

30. The system according to claim 18, wherein the first and second plurality of transparent protrusions extend vertically in the plane of the first or second surface of the optical device.

31. The system according to claim 18, wherein the thickness of the optical device is from about 0.1 mm to about 2.5 mm.

32. The system according to claim 18, wherein sides of the opaque sections are linear.

33. The system according to claim 18, wherein sides of the opaque sections are curved.

34. The system according to claim 18 further comprising:
a transparent layer adjacent at least a portion of the first or second surface of the optical device.

35. The system according to claim 18, wherein the viewing display is at least one of a plasma display panel, a liquid crystal display panel, an inorganic light emitting diode display panel, and an organic light emitting diode display panel.

36. The system according to claim 18, wherein the viewing display is a plasma display panel.

37. A method for improving privacy or contrast of viewing display comprising:
providing an optical device having first and second opposing surfaces, wherein the optical device comprises a first portion having a first plurality of transparent protrusions extending from the first surface and a second portion having a second plurality of transparent protrusions extending from the second surface, wherein the first plurality of transparent protrusions directly engage to mate and self-align with the second plurality of transparent protrusions form a plurality of spaced openings, said openings being at least partially filled with an opaque material and positioned to create alternating opaque and transparent sections; and
positioning at least a portion of the second surface of the optical device proximate at least a portion of an output surface of a viewing display, wherein a portion of ambient light is absorbed by the optical device before reaching the viewing display and a portion of ambient light reflected from the viewing display is absorbed by the optical device.

38. The method according to claim 37, wherein the refractive index of the first and second portions is substantially equal.

39. The method according to claim 37, wherein the refractive index of the opaque material is within 0.03 of the refractive index of the first and second plurality of transparent protrusions.

40. The method according to claim 37, wherein the refractive index of the opaque material is greater than the refractive index of the first and second plurality of transparent protrusions.

41. The method according to claim 37, wherein the first and second portions are substantially the same in cross-section, but the first portion is inverted as compared to the second portion.

42. The method according to claim 37, wherein the first plurality of transparent protrusions includes at least one mating surface that self-aligns with at least one mating surface of the second plurality of protrusions.

43. The method according to claim 37, wherein the first and second plurality of transparent protrusions have a cross-sectional shape which is at least one of triangular, trapezoidal, rectangular, and square.

44. The method according to claim 37, wherein the plurality of openings have a cross-sectional shape which is at least one of triangular, trapezoidal, rectangular, and square.

45. The method according to claim 37, wherein the first and second plurality of transparent protrusions have an aspect ratio of from about 1 to about 5.

46. The method according to claim 37, wherein the opaque sections have an aspect ratio of from about 0.5 to about 10.

47. The method according to claim 37, wherein the duty factor of the opaque sections is from about 0.05 to about 0.85.

48. The method according to claim 37, wherein the first and second plurality of transparent protrusions extend horizontally in the plane of the first or second surface of the optical device.

49. The method according to claim 37, wherein the first and second plurality of transparent protrusions extend vertically in the plane of the first or second surface of the optical device.

50. The method according to claim 37, wherein the thickness of the optical device is from about 0.1 mm to about 2.5 mm.

51. The method according to claim 37, wherein sides of the opaque sections are linear.

52. The method according to claim 37, wherein sides of the opaque sections are curved.

53. The method according to claim 37 further comprising:
a transparent layer adjacent at least a portion of the first or second surface of the optical device.

54. The method according to claim 37, wherein the viewing display is at least one of a plasma display panel, a liquid crystal display panel, an inorganic light emitting diode display panel, and an organic light emitting diode display panel.

55. The method according to claim 54, wherein the viewing display is a plasma display panel.

* * * * *